United States Patent [19]

Otsuki et al.

[11] Patent Number: 5,409,764

[45] Date of Patent: Apr. 25, 1995

[54] CURABLE ADHESIVE COMPOSITION AND SHEET THEREOF

[75] Inventors: Tsukasa Otsuki; Masato Yanagi; Toshikazu Onikubo; Kouichi Iibuchi, all of Tokyo, Japan

[73] Assignee: Toyo Ink manufacturing Co., Ltd., Tokyo, Japan

[21] Appl. No.: 311,453

[22] Filed: Sep. 23, 1994

Related U.S. Application Data

[63] Continuation of Ser. No. 224,989, Apr. 8, 1994, abandoned, which is a continuation of Ser. No. 945,730, Sep. 15, 1992, abandoned, which is a continuation-in-part of Ser. No. 730,990, Jul. 16, 1991, abandoned.

[30] Foreign Application Priority Data

Jul. 17, 1990 [JP] Japan ................. 2-188683
Feb. 7, 1991 [JP] Japan ................. 3-38024
Mar. 21, 1991 [JP] Japan ................. 3-91452

[51] Int. Cl.$^6$ ................. B32B 7/02
[52] U.S. Cl. ................. 428/221; 528/272; 528/291; 528/296; 528/297; 528/301; 528/302; 528/303; 528/306; 528/307; 525/11; 525/28; 525/165; 525/168; 525/171; 525/172; 525/185; 525/437; 525/440; 525/445; 525/447; 525/448; 525/449; 428/245; 428/261; 428/482; 522/24; 522/65

[58] Field of Search ............ 528/272, 291, 296, 297, 528/301, 302, 303, 306, 307; 525/11, 28, 165, 168, 171, 172, 185, 437, 440, 445, 447, 448, 449; 428/245, 221, 261, 482; 522/24, 65

[56] References Cited

U.S. PATENT DOCUMENTS 3,673,148 6/1972 Vasta ................. 428/481
3,993,815 11/1976 Douek et al. ................. 428/40
4,243,462 1/1981 Hori et al. ................. 156/310

FOREIGN PATENT DOCUMENTS 0316873 5/1989 European Pat. Off.
1408551 3/1973 United Kingdom.

Primary Examiner—Samuel A. Acquah
Attorney, Agent, or Firm—Wenderoth, Lind & Ponack

[57] ABSTRACT

A curable adhesive composition comprising an unsaturated polyester oligomer (A) of any of the following formulae (I) to (IV), obtained by reacting a compound (a) having a hydroxyl group and/or an amino group, a cyclic acid anhydride (b) and an epoxide (c) having an ethylenically unsaturated group, and an adhesive polymer (B),

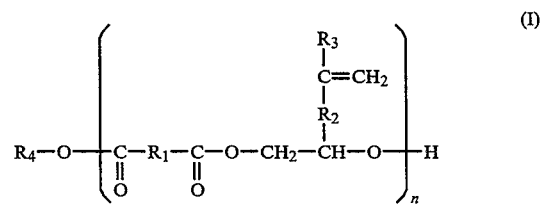

(I)

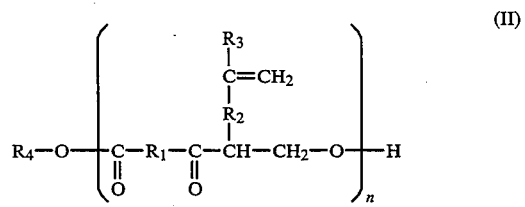

(II)

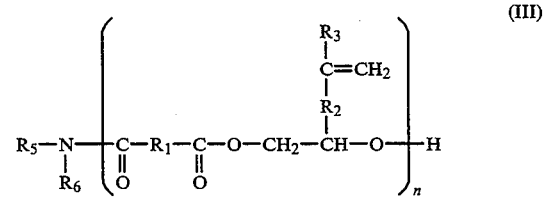

(III)

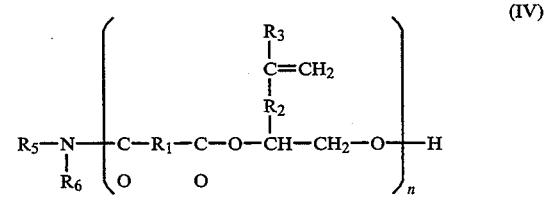

(IV)

(Abstract continued on next page.)

wherein:
$R_1$ is a divalent organic moiety having 1 to 40 carbon atoms,
$R_2$ is a divalent organic moiety having 1 to 10 carbon atoms,
$R_3$ is hydrogen or methyl,
$R_4$ is a monovalent organic moiety having 1 to 40 carbon atoms,
$R_5$ is a monovalent organic moiety having 1 to 40 carbon atoms,
$R_6$ is hydrogen or a monovalent organic moiety having 1 to 10 carbon atoms, and
n is an integer of 2 or greater.

17 Claims, No Drawings

CURABLE ADHESIVE COMPOSITION AND SHEET THEREOF

This application is a continuation of now abandoned application Ser. No. 08,224,989, filed Apr. 8, 1994, which is a continuation of abandoned application Ser. No. 07/945,730, filed Sep. 15, 1992, which is a continuation-in-part of Ser. No. 07/730,990, filed Jul. 16, 1991, now abandoned.

FIELD OF THE INVENTION

The present invention relates to a curable adhesive composition which exhibits adhesion and adheres to an adherend temporarily when attached to the adherend, and which is cured to exhibit high bonding power when heated, irradiated with light or attached in the form of two sheets, and a sheet thereof. Further, it relates to a curable adhesive composition which has excellent adhesion to a plastic film or plastic molded article formed of a polyolefin, polycarbonate, etc., and a sheet thereof.

PRIOR ART OF THE INVENTION

There have been conventionally known curable adhesive compositions produced by incorporating a reactive oligomer or monomer to a nonreactive or reactive adhesive polymer (see JP-B-50-28970, JP-B-53-31898, JP-A-53-118439, U.S. Pat. No. 4,243,462, JP-A-50-69178, JP-B-61-18591, JP-A-61-83273, JP-A-61-83274, JP-A-61-101583, JP-B-1-36513, JP-B-2-5791, etc.). However, these compositions have the following problem: The adhesion properties before the curing, cohesive power in particular, are deteriorated when the amount of the reactive oligomer or monomer is increased in order to obtain sufficient adhesion of the cured composition. As a result, there is a risk that a deviation or peel occurs before the composition is cured. On the other hand, when the amount of the reactive oligomer or monomer is decreased in order to improve the adhesion properties before the curing, cohesive power in particular, these compositions show a decreased curability, and as a result, no sufficient bond strength is obtained. As described above, there has been developed no curable adhesive composition which is excellent in both the adhesion properties before cured, cohesive power in particular, and the bond strength after cured.

In JP-A-1-188508, JP-A-1-193314 and JP-A-1-193315, part of the present inventors have proposed an adhesive composition being excellent in the adhesion properties before cured and the bond strength after cured, which contains a polymer imparted with curability by introducing a graft chain having a plurality of unsaturated groups into the polymer. However, this adhesive composition has some problems from the viewpoint of synthesis and physical properties.

The above adhesive composition is synthesized by a reaction in which a graft chain is introduced into a polymer. Therefore, there are problems in that the reaction rate is very low, an offensive odor is caused by unreacted materials when the reaction is terminated before completed, and the performance is deteriorated. Further, it has been difficult to produce an adhesive composition which has an excellent balance between the adhesion properties and the bond strength after cured.

A curable adhesive tape or sheet (to be referred to as "sheet" hereinafter) which has adhesion and temporarily adheres to an adherend when attached and which is gradually cured after attached and exhibits high bond strength is classified into the following types: A moisture-curable type which is cured with moisture in air or water contained in an adherend (JP-B-47-44017, JP-B-49-5895, JP-A-54-64536, JP-A-58-171460, JP-A-59-58071, JP-A-61-145258, and JP-A-61-148281); a heat-curable type which is cured with heat (JP-B-50-12464, JP-A-51-6235, JP-A-54-102335, JP-B-55-8113, JP-B-59-14508, JP-A-59-108072, JP-A-60-217283, and JP-A-61-81467); a photo-curable type which is optically cured (JP-A-56-120786, JP-A-57-159864, JP-A-60-69178, and JP-A-61-162574); and an anaerobically curable type which is cured by shutting air off (JP-B-58-12918, JP-A-59-199784, JP-A-59-199785, JP-A-60-6773, JP-A-60-11568, and JP-A-60-13868).

All of these curable adhesive sheets have serious problems. That is, the moisture-curable sheet is required to be preserved in a dry state before use, and special facilities are also required for the production thereof. The heat-curable sheet cannot be applied to a material of which the heat resistance is low. The photo-curable sheet is required to have a light-permeable sheet as a substrate. The anaerobically curable sheet is required to be preserved in such a state that it is always in contact with air, and the preservation of this type for maintaining good curability is difficult. Thus, it is difficult to attain a good balance between the curability and the preservability.

In principle, the most desirable is a curable adhesive sheet which has a function of being cured to bond an article by only applying it without any additional energy. The above moisture-curable and anaerobically curable sheets belong to this type. In view of preservability, however, it is very difficult to allow the moisture curable and anaerobically curable type adhesives in the form of a conventional sheet to exhibit such a function. Even if it is possible, the resultant adhesive sheet has a poor balance between the preservability and curability.

In order to overcome the above problems, JP-A-58-67775 proposes a combination of curable adhesive sheets which separately contain different reactive components. These two sheets are attached to each other when used. In order for a combination of these two sheets to exhibit high bond strength by a reaction at an ordinary temperature, the design of the resin structure is extremely essential, and no conventional curable adhesive compositions can exhibit satisfactory performance. The problem of the above two-sheet laminate type curable adhesive sheet using conventional resins is that it shows a poor balance between the adhesion properties when attached to an adherend and the bonding properties after it is cured. In almost all cases, a two-sheet laminate type curable sheet having good adhesion properties when attached has poor bond strength, and that which has good bond strength has poor adhesion properties when attached. Therefore, if the preservability and curability are compatible, a curable adhesive sheet having an excellent balance between the adhesion properties when attached and the bonding properties can be obtained only when a suitable resin designing is achieved.

SUMMARY OF THE INVENTION

It is an object of the present invention to provide a curable adhesive composition which has excellent adhesion properties when attached to an adherend and exhibits high bond strength after cured, and a sheet of the composition.

It is another object of the present invention to provide a curable adhesive composition having an excellent balance between the adhesion properties before cured and the bond strength after cured, and a sheet of the composition.

It is further another object of the present invention to provide a curable adhesive composition which can be easily produced, and a sheet of the composition.

Further, it is another object of the present invention to provide a combination of curable adhesive sheets which exhibit excellent adhesion properties when attached to an adherend and exhibit high bond strength after attached together and cured.

Further, it is another object of the present invention to provide a curable adhesive composition having excellent adhesion to a plastic film and a plastic molded article, and a sheet of the composition.

According to the present invention, there is provided a curable adhesive composition comprising an unsaturated polyester oligomer (A) of any of the following formulae (I) to (IV), obtained by reacting a compound (a) having a hydroxyl group and/or an amino group, a cyclic acid anhydride (b) and an epoxide (c) having an ethylenically unsaturated group, and an adhesive polymer (B),

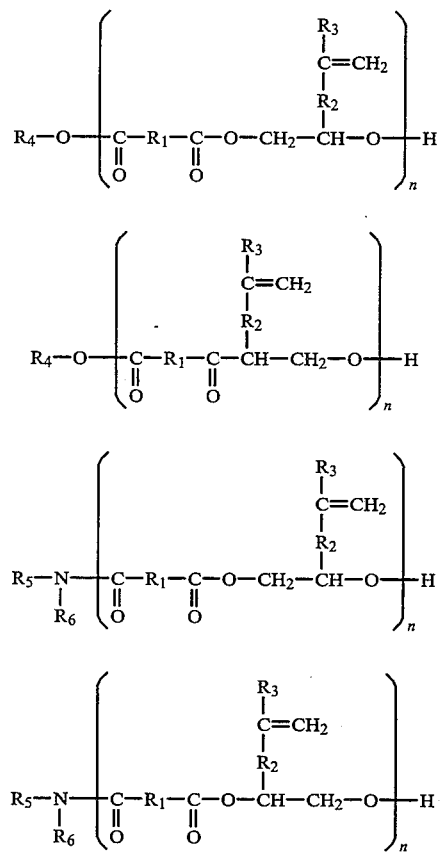

wherein:
$R_1$ is a divalent organic moiety having 1 to 40 carbon atoms,
$R_2$ is a divalent organic moiety having 1 to 10 carbon atoms,
$R_3$ is hydrogen or methyl,
$R_4$ is a monovalent organic moiety having 1 to 40 carbon atoms,
$R_5$ is a monovalent organic moiety having 1 to 40 carbon atoms,
$R_6$ is hydrogen or a monovalent organic moiety having 1 to 10 carbon atoms, and
n is an integer of 2 or greater.

According to the present invention, there is further provided a combination of a curable adhesive sheet comprising the above curable adhesive composition and a polymerization initiator with a curable adhesive sheet comprising an adhesive composition comprising an unsaturated polyester oligomer (A), an adhesive polymer (B) and a polymerization promoter, the compositions being cured by attaching the curable adhesive sheets to each other.

DETAILED DESCRIPTION OF THE INVENTION

The curable adhesive composition of the present invention is similar to conventional adhesive compositions in that each of these is a blend of an adhesive polymer and a reactive oligomer. However, in conventional adhesives of a blend type, the properties of these two members which are blended are mutually negated, and no good adhesive can be obtained. In contrast, the polyester oligomer (A) used in the present invention as an oligomer has poor compatibility with the adhesive polymer (B), and it is considered that the polyester oligomer (A) forms a microphase separation structure. For this reason, the (A) polyester oligomer not only imparts the adhesive composition with curability but also characteristically improves the adhesion properties, cohesive power in particular, which are deteriorated in conventional adhesive compositions. Further, when polyisocyanate is incorporated, the cohesive power is remarkably improved without impairing curability.

The substituents, $R_1$ to $R_6$, on the unsaturated polyester oligomers (A) of the formulae (I) to (IV) used in the present invention are preferably as follows. $R_1$ is a divalent organic moiety having 2 to 18 carbon atoms, which is derived from an aromatic ring, a cyclohexane ring and alkylene. $R_2$ is a divalent organic moiety having 1 to 6 carbon atoms, which includes alkylene. $R_4$ is a monovalent organic moiety having 1 to 18 carbon atoms, which includes hydroxyalkyl, carboxyalkyl, aminoalkyl, carboxyphenyl and hydroxyphenyl. $R_5$ is a monovalent organic moiety having 1 to 18 carbon atoms, which includes alkyl, aminoalkyl and aminophenyl. $R_6$ is hydrogen or a monovalent organic moiety having 1 to 6 carbon atoms, which includes alkyl and phenyl.

The polyester oligomer (A) is obtained by reacting (a) a compound having a hydroxyl group and/or an amino group (to be sometimes referred to as compound (a) hereinafter), (b) a cyclic acid anhydride and (c) an epoxide having an ethylenically unsaturated group. The compound (a) is required to have a functional group at which the reaction starts, such as a hydroxyl group and/or primary, secondary and/or tertiary amino groups, in order to carry out the initial reaction smoothly and adjust the molecular weight of the polyester oligomer (A) being formed. In view of the properties of the materials and the product and ease in control during the reaction, preferred is a compound having a hydroxyl group.

The compound having a hydroxy group is selected from those compounds having an alcoholic or phenolic hydroxyl group; i.e. saturated aliphatic alcohols such as methanol, ethanol, 1-propanol, 2-propanol, 1-butanol, 2-butanol, pentanol, hexanol, etc.; unsaturated aliphatic alcohols such as allyl alcohol, crotyl alcohol, propargyl alcohol, etc., hydroxyl group-containing (meth)acrylates or (meth)acrylamides such as 2-hydroxyethyl (meth)acrylate, 2-hydroxypropyl (meth)acrylate, 3-hydroxypropyl (meth)acrylate, 4-hydroxybutyl (meth)acrylate, N-methylolacrylamide, etc.; alicyclic alcohols such as cyclopentanol, cyclohexanol, etc.; aromatic alcohols such as benzyl alcohol, cinnamyl alcohol, etc.; heterocyclic alcohols such as furfuryl alcohol, tetrahydrofurfuryl alcohol, etc.; diols such as ethylene glycol, propylene glycol, 1,4-butylene glycol, butenediol, hexanediol, cyclohexanediol, bisphenol A, diethylene glycol, etc.; triols such as glycerin, trimethylolpropane, etc., phenols such as phenol, o-cresol, m-cresol, p-cresol, etc.

Further, preferred are compounds having at least two functional groups, i.e. the above diols, compounds which have both a carboxyl group and a hydroxyl group such as, 2-hydroxy-2-butyric acid, 3-hydroxy-n-butyric acid, p-hydroxybenzoic acid, hydroxypivalic acid, salicylic acid, vanillic acid, 1,2-hydroxystearic acid, etc.; and compounds having both an amino group and a hydroxyl group such as ethanolamine, 1-amino-2-propanol, o-aminophenol, m-aminophenol, p-aminophenol, etc.

The compound having an amino group is selected from compounds having a primary amino group such as N-alkylamines, e.g. monopropylamine, monobutylamine, etc., hexamethylenediamine, trimethylhexamethylenediamine, polyoxypropylenediamine, 3,3'-dimethyl-4,4'-diaminodicyclohexylmethane, isophoronediamine, 4,4'-diaminodicyclohexylmethane, 1,3-bis(aminomethyl)cyclohexane, toluylenediamine, 4,4'-diaminodiphenyl ether, xylylenediamine, etc.; compounds having a secondary amino group such as diisopropylamine, dibutylamine, 2-methylimidazole, diphenylguanidine, diethylthiourea, etc.; and compounds having a tertiary amino group such as dimethylbenzylamine, methyl 4-dimethylaminobenzoate, p-dimethylaminoacetophenone, N,N-dimethylcyclohexylamine, N,N',N''-tris(dimethylaminopropyl)-hexahydro-S-triazine, etc.

The cyclic acid anhydride (b) refers to an inner anhydride of a polybasic acid such as a saturated or unsaturated aliphatic polybasic acid anhydride, alicyclic polybasic acid anhydride, aromatic polybasic acid anhydride, and any one of these of which part is substituted with a saturated or unsaturated hydrocarbon group, an aromatic group, a halogen atom, a heterocyclic group, etc. Specifically, the cyclic acid anhydride (b) is selected from succinic anhydride, phthalic anhydride, maleic anhydride, iraconic anhydride, glutaric anhydride, dodecenylsuccinic anhydride, anhydride, pyromellitic anhydride, trimellitic anhydride, cyclopentanetetracarboxylic dianhydride, hexahydrophthalic anhydride, methylhexahydrophthalic anhydride, tetramethylenemaleic anhydride, tetrahydrophthalic anhydride, methyltetrahydrophthalic anhydride, endomethylenetetrahydrophthalic anhydride, methyl endomethylenetetrahydrophthalic anhydride, 5-(2,5-dioxotetrahydroxyfuryl)-3-methylcyclohexene-1,2-dicarboxylic anhydride, anhydrous methyl Nadic acid, benzophenontetracarboxylic anhydride, glycerol tris(anhydrotrimellitate), ethylene glycol bis(anhydrotrimellitate), etc. Of these, preferred are dibasic acid anhydride and tribasic acid anhydride which do not form a crosslinked structure.

The epoxide (c) having an ethylenically unsaturated group is selected from glycidyl (meth)acrylate, glycidyl cinnamate, acryl glycidyl ether, vinylcyclohexene monoepoxide, 1,3-butadiene monoepoxide, 1,3-butadiene monoepoxide, etc., and these epoxides may be substituted with an unsaturated hydrocarbon group, an aromatic group, a halogen atom, a heterocyclic group, etc.

The polyester oligomer (A) having an ethylenically unsaturated group is obtained by reacting the above compound (a) having a hydroxyl group and/or an amino group, the above cyclic acid anhydride (b) and the above epoxide (c). The reaction is carried out in the presence of a proper solvent or no solvent and in the presence of a catalyst as required. The catalyst is selected from tertiary amines such as N,N-dimethylbenzylamine, triethylamine, tributylamine, N,N-diethylaniline, N,N-dimethylaniline, etc., and others. In order to protect the ethylenically unsaturated group, a radical polymerization inhibitor may be present. The radical polymerization inhibitor is selected from hydroquinone, hydroquinone monomethyl ether, tert-butylcatechol, p-benzoquinone, etc.

In the above reaction, the hydroxyl or amino group of the compound (a) and the acid anhydride group of the cyclic anhydride (b) react with each other preferentially, and then, the carboxyl group formed by this preferential reaction reacts with the epoxy group of the epoxide (c) to form a secondary hydroxyl group. Further, the formed hydroxyl group and/or the amino group react with the acid anhydride group of the cyclic acid anhydride (b). The reaction proceeds further in this manner.

When a compound having a hydroxyl group is used as the compound (a), the unsaturated polyester (A) can be obtained according to the following reaction scheme.

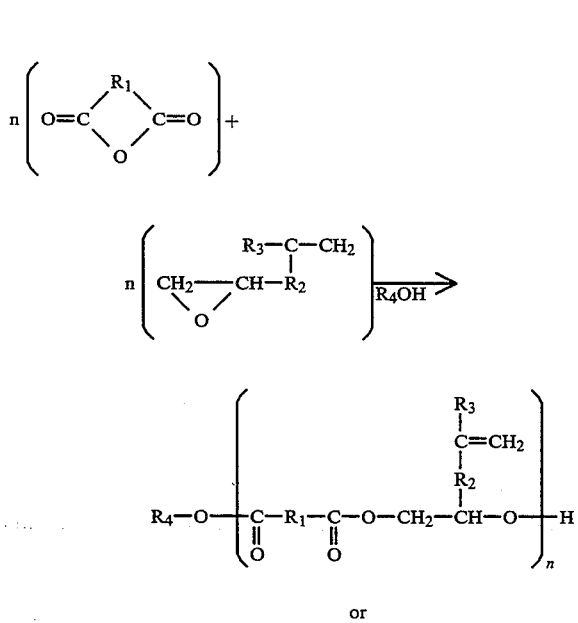

or

-continued

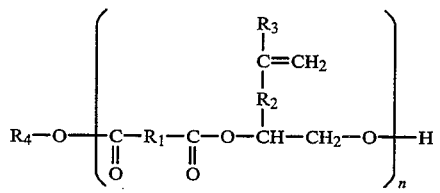

wherein $R_1$ to $R_4$ and n are as defined in the formulae (I) to (IV).

In this reaction, the amount of each of the cyclic acid anhydride (b) and the epoxide (c) is adjusted relative to the compound (a), whereby there is obtained the unsaturated polyester oligomer (A) which is terminated with the compound having a hydroxyl group and/or an amino group (a) and which has a desired number of ethylenically unsaturated groups and a desired length. When the cyclic acid anhydride (b) is a dibasic acid anhydride, the amount of the cyclic acid anhydride (b) per mole of the compound (a) is 2 to 20 moles, and the amount of the epoxide (c) per mole of the compound (a) is 2 to 20 moles. Further, the amounts of the cyclic acid anhydride (b) and the epoxide (c) are preferably equimolar. When the cyclic acid anhydride (b) is a tribasic acid anhydride, the amount of the cyclic acid anhydride (b) per mole of the compound (a) is 2 to 10 moles, and the amount of the epoxide (c) per mole of the compound (a) is 2 to 20 moles. Further, the amount of the epoxide (c) per mole of the cyclic acid anhydride (b) is preferably 1 to 2 moles. When the amount of the cyclic acid anhydride (b) or the epoxide (c) per mole of the compound (a) is less than 2 moles, the resultant polyester oligomer (A) has too low a molecular weight, and part of the compound (a) remains. As a result, the required properties cannot be obtained. When the amount of the cyclic acid anhydride (b) or the epoxide (c) exceeds 20 moles, it is difficult to control the reaction, or the resultant polyester oligomer (A) has too high a molecular weight. As a result, the required properties cannot be obtained.

In the present invention, the adhesive polymer (B) includes adhesive acrylic polymers and adhesive rubber-based polymers. The term "adhesive acrylic polymers" refers to acrylic polymers having a hydroxy group, a tertiary amino group, a carboxyl group, an amido group, an N-substituted amido group, a nitrile group, etc., which are generally used as an acrylic resin in an adhesive composition. The acrylic polymer having such a functional group is a copolymer composed of at least one member selected from monomers having a hydroxyl group, a tertiary amino group, a carboxyl group, an amido group, an N-substituted amido group, a nitrile group, etc., and a monomer selected from alkyl (meth)acrylate, vinyl acetate, vinyl propionate, vinyl ether, styrene, etc.

The monomer having a hydroxyl group is selected from 2-hydroxy (meth)acrylate, 2-hydroxypropyl (meth)acrylate, 3-hydroxypropyl (meth)acrylate, 4-hydroxybutyl (meth)acrylate, N-methylolacrylamide, allyl alcohol, etc. The monomer having a tertiary amino group is selected from dimethylaminoethyl (meth)acrylate, diethylaminoethyl (meth)acrylate, dimethylaminopropyl(meth)acrylamide, etc. The monomer having a carboxyl group is selected from acrylic acid, methacrylic acid, crotonic acid, maleic acid, fumaric acid, iraconic acid, citraconic acid, etc. The monomer having an amido or N-substituted amido group is selected from acrylamide, methacrylamide, N-methyl(meth)acrylamide, N-ethyl (meth)acrylamide, N-methoxymethyl (meth)acrylamide, N-ethoxymethyl (meth)acrylamide, N-propoxymethyl (meth)acrylamide, N-butoxymethyl (meth)acrylamide, N-tert-butylacrylamide, N-octylacrylamide, diacetoneacrylamide, etc. The monomer having a nitrile group is selected from acrylonitrile, methacrylonitrile, crotononitrile, fumaronitrile, etc. The alkyl (meth)acrylate is selected from methyl (meth)acrylate, ethyl (meth)acrylate, butyl (meth)acrylate, 2-ethylhexyl (meth)acrylate, octyl (meth)acrylate, etc. Further, the adhesive polymer (B) may be synthesized from monomers which are generally used for the synthesis of acrylic polymers such as cyclohexyl (meth)acrylate, benzyl (meth)acrylate, tetrahydrofurfuryl (meth)acrylate, and alkyl (meth)acrylates of which the alkyl group is substituted with an aromatic ring group, a heterocyclic group, a halogen atom, etc.

The reaction for the above synthesis is an ordinary radical polymerization reaction. The method for the reaction is not specially limited. The reaction is carried out by a known polymerization method such as solution polymerization, bulk polymerization, emulsion polymerization, etc. Preferred is the solution polymerization method, since it is easy to control the reaction and a next procedure can be directly continued. The solvent for the polymerization is selected from methyl ethyl ketone, methyl isobutyl ketone, toluene, cellosolve, ethyl acetate, butyl acetate, etc., which can dissolve the resin used in the present invention. These solvents may be used alone or in combination. The polymerization initiator may be used for the polymerization reaction. The polymerization initiator is selected from organic peroxides such as benzoyl peroxide, acetyl peroxide, methyl ethyl ketone peroxide, lauroyl peroxide, etc., azo initiators such as azobisisobutyronitrile, etc., and any other known initiators.

The adhesive rubber-based polymer is selected from natural or synthetic cis-1,4-polyisoprene rubber, reclaimed rubber, polyisobutylene, butyl rubber, halogenated butyl rubber, partially vulcanized butyl rubber, a styrene-butadiene-styrene block copolymer (SBS), a styrene-isoprene-styrene block copolymer (SIS), a hydrogenated styrene-butadiene-styrene block copolymer, silicone rubber, chloroprene rubber, nitrile rubber, butadiene rubber, etc. These are generally used as a rubber-based resin for adhesives and referred to as elastomers. Preferred as a adhesive polymer (B) are block copolymers such as SBS, SIS, hydrogenated SBS, etc., which have very high cohesive power. Further, those polymers which have poor adhesion properties but exhibit good adhesion properties in the presence of the polyester oligomer (A) or other resin may be used as an adhesive polymer (B) of the present invention.

The unsaturated polyester oligomer (A) obtained as specified above and the adhesive polymer (B) obtained as specified above are mixed with each other, whereby an adhesive composition having curability can be obtained. It is sufficient to carry out the mixing by stirring the mixture until it is apparently homogeneous at room temperature. In order to improve the mixture state of these members, the mixing may be carried out by stirring the mixture under heat at a temperature of not higher than the boiling point of a solvent (used for the synthesis of the unsaturated polyester oligomer (A) or used for the synthesis or dissolution of the adhesive polymer (B)). The adhesive polymer (B)/unsaturated polyester oligomer (A) is preferably 100 parts by weight/10 to 300 parts by weight, more preferably 100 parts by weight/20 to 150 parts by weight. When the amount of the unsaturated polyester oligomer is smaller than the above range, the resultant adhesive composition shows poor curability. When it is larger than the above range, it is difficult to achieve a good balance among peel adhesion strength, tack and holding power.

In the present invention, the polyester oligomer (A) has an unsaturated group due to the use of the epoxide having an ethylenically unsaturated group. Therefore, the curable adhesive composition of the present invention can be simply thermally cured, anaerobically cured, photo-cured, or cured by means of actinic radiation optionally in the copresence of a proper polymerization initiator.

The polymerization initiator to be used for the thermal cure or anaerobical cure is selected from known organic peroxides and azo compounds: Examples of the organic peroxides are dialkyl peroxides such as di-tert-butyl peroxide, tertbutylcumyl peroxide, dicumyl peroxide, etc., diacyl peroxides such as acetyl peroxide, lauroyl peroxide, benzoyl peroxide, etc., ketone peroxides such as methyl ethyl ketone peroxide, cyclohexanone peroxide, 3,3,5-trimethylcyclohexanone peroxide, methylcyclohexanone peroxide, etc., peroxyketals such as 1,1-bis(tert-butylperoxy)cyclohexane, etc., hydroperoxides such as tert-butylhydroperoxide, cumenehydroperoxide, 1,1,3,3-tetramethylbutylhydroperoxide, p-menthanehydroperoxide, diisopropylbenzenehydroperoxide, 2,5-dimethylhexane-2,5-dihydroperoxide, etc., and peroxy esters such as tert-butylperoxyacetate, tert-butyl-peroxy-2-ethylhexanoate, tert-butylperoxybenzoate, etc.; and examples of the azo compounds are azobisisobutyronitrile, 2,2'-azobis(2-methylpropionitrile), 2,2'-(azobis(2-methylbutyronitrile), 2,2'-azobis(2,4-dimethylvaleronitrile), 2,2'-azobis(4-methoxy-2,4-dimethylvaleronitrile), etc.

The amount of the polymerization initiator for use per 100 parts by weight of the total of the unsaturated polyester oligomer (A) and the adhesive polymer (B) is generally 0.1 to 15 parts by weight, preferably 0.5 to 5 parts by weight.

When the organic peroxide for use has a low radical generation rate, a polymerization promoter may be used in combination. Such a polymerization promoter is selected from tertiary amines such as N,N-dimethylbenzylamine, triethylamine, tributylamine, N,N-diethylaniline, N,N-dimethylaniline, N-phenyldiethanolamine, N-phenyldiisopropanolamine, dimethyl-p-toluidine, triethanolamine, 4-phenylmorpholine, etc.; and metal compounds including fatty acid salts such as laurate, naphthenate, octylate, oleate, octenate, etc., of a metal such as lithium, calcium, strontium, barium, cerium, zirconium, vanadium, molybdenum, manganese, iron, cobalt, nickel, copper, zinc, tin, lead, etc., resin acid salts such as rosin salt of such a metal, chelate compounds such as acetylacetonate complex salt of such a metal, etc. These polymerization promoter may be used alone or in combination as such. When the curable adhesive composition is anaerobically cured, it is preferred to use one member of the above tertiary amines, one member the above metal compounds, or these two members in combination with the organic peroxide. The amount of the tertiary amine for use per 100 parts by weight of the organic peroxide is 1 to 100 parts by weight. The amount of the metal compound for use per 100 parts by weight of the organic peroxide is 0.01 to 10 parts by weight. It is desirable to micro-encapsulate the polymerization promoter in order to prevent the curing during the preservation.

The polymerization initiator to be used for the photo-cure is selected from benzoins such as benzoin, benzoin methyl ether, benzoin ethyl ether, methyl o-benzoinbenzoate, p-benzoin ethyl ether, benzoin isopropyl ether, α-methylbenzoin, etc.; acetophenones such as dimethyl benzyl ketal, trichloroacetophenone, 2,2-diethoxyacetophenone, etc.; propiophenones such as 2-hydroxy-4'-isopropyl-2-methylpropiophenone, etc.; benzophenones such as α-acyloxime ester, benzophenone, methylbenzophenone, p-chlorobenzophenone, p-dimethylbenzophenone, etc.; thioxanthones such as 2-crotylthioxanthone, 2-ethylthioxanthone, 2-isopropyl thioxanthone, etc.; benzyl; dibenzosuberone, and the like. Further, those described in "UV-EV-Cure Hand Book-Materials-" edited by Kiyomi Kato (Kobunshi Gakkai, December 1985), pp. 67–73 or "Crosslinking Agent Handbook" edited by Shinzo Yamashita and Tosuke Kaneko (Taiseisha, October 1981), pp. 582–593 are also usable. These polymerization initiators may be used in combination with a polymerization promoter.

The above polymerization promoter is selected from 4,4'-bis(diethylamino)benzophenone, ethyl N-dimethylaminobenzoate, dimethylethanolamine, glycine and those described in the above document edited by Kiyomi Kato, pp. 67–73. When light having a relatively long wavelength such as ultraviolet light or visible light is used for the curing, it is preferred to use the polymerization initiator and, optionally, the promoter from the viewpoint of curing efficiency. The amount of the polymerization initiator for use per 100 parts by weight of the total of the unsaturated polyester oligomer (A) and the adhesive polymer (B) is generally 0.05 to 20 parts by weight, preferably 0.5 to 10 parts by weight.

The above polymerization initiator may be micro-encapsulated, whereby the curable adhesive composition or a sheet formed from the composition can be preserved safely for long period of time before use. In particular, in the case of anaerobical cure, the micro-encapsulation of either the polymerization initiator or the promoter, or both of these, improves the preservation stability to a great extent. The method for the micro-encapsulation of the polymerization initiator and promoter is not specially limited. The micro-encapsulation is carried out by an interfacial polymerization method described in Japanese Patent Publications Nos. 38-19574, 42-446, 42-771, 42-2882 and 42-2883, JP-A-56-115371, JP-A-60-60173, etc.; an in-situ polymerization method described in Japanese Patent Publication No. 36-9168, U.S. Pat. No. 3,427,250, British Patent 1,236,498, etc., an in-liquid cure coating method described in U.S. Pat. No. 3,787,327, U.S. Pat. No. 3,551,346, U.S. Pat. No. 3,574,133, etc., a coacervation method (phase separation method) described in U.S. Pat. No. 2,800,457, U.S. Pat. No. 2,800,458, U.S. Pat. No. 3,531,418, U.S. Pat. No. 3,577,515 and British Patent 1,117,178, an interfacial precipitation method described in U.S. Pat. No. 3,523,906, U.S. Pat. No. 3,660,304, etc., a spray-dry method described in U.S. Pat. No. 3,830,750, and other methods. Of these methods, preferred are an interfacial polymerization method in which microcapsules having a polyurea wall are formed, and a coacervation method in which microcapsules having a wall of gelatin and gum arabic are formed. In these methods, the thickness of the microcapsule wall can be freely controlled, the thickness of the microcapsule wall can be rendered uniform and the strength of the microcapsule wall can be increased. The detailed micro-encapsulation methods are disclosed in the above-described patents, JP-A-1-193,314, etc.

When the adhesive acrylic polymer is used as an adhesive polymer (B), the adhesive acrylic polymer may be partially crosslinked by adding polyisocyanate to the curable adhesive composition in order to improve the adhesion properties, cohesive power in particular, before the curing. Such a polyisocyanate is selected from diisocyanates such as tolylene diisocyanate, 4,4'-diphenylmethane diisocyanate, hexamethylene diisocyanate, m-xylene diisocyanate, p-xylene diisocyanate, 1,5-naphthalene diisocyanate, isophorone diisocyanate, lysine diisocyanate, hydrogenated 4,4'-diphenylmethane diisocyanate, hydrogenated tolylene diisocyanate, etc.; adducts being composed of these and either glycols or diamines and having an isocyanate terminal at each of the ends; and mixtures of these. Polyisocyanates having three functional groups or more such as triphenylmethane diisocyanate, polymethylenepolyphenyl isocyanate, etc., may be used as required by mixing them with diisocyanates.

The amount of the polyisocyanate for use per 100 parts by weight of the total of the unsaturated polyester oligomer (A) and the adhesive acrylic polymer is 0.1 to 15 parts by weight, preferably 0.1 to 5 parts by weight.

In order to adjust the adhesion properties before the curing and the bond strength after the curing, a polyester oligomer synthesized from an epoxide having no ethylenically unsaturated group may be used as part of the polyester oligomer of the present invention may be used as an polyester oligomer (A) of the present invention. The epoxide having no ethylenically unsaturated group is selected from epichlorohydrin, phenyl glycidyl ether, styrene oxide, cyclohexene oxide, butene oxide, etc.

In order to further improve the bond strength after the curing, other monomer or oligomer having an ethylenically unsaturated group such as methacryloyl group than the unsaturated polyester oligomer (A) may be incorporated into the curable adhesive composition of the present invention. Such a monomer or oligomer is selected from styrene, alkyl (meth)acrylate, (meth)acrylic acid, polyhydric alcohol (meth)acrylate, epoxy poly(meth) acrylate, oligoester poly(meth)acrylate, polyurethane poly(meth) acrylate, diallyl phthalate, diallyl isophthalate, etc. The amount of this monomer or oligomer for use is not more than 60% by weight based on the total solid content of the curable adhesive composition of the present invention. When this amount exceeds 60% by weight, the adhesion properties, cohesive power in particular, before the curing are extraordinarily deteriorated.

In the present invention, a tackifier may be added to the curable adhesive composition. The tackifier refers to a substance which imparts the adhesive polymer (B) with tackiness. The tackifier is selected from natural resins such as rosin-containing resins, terpene-containing resins, etc., and derivatives of these, and synthetic resins such as petroleum resins: Specific examples of the rosin-containing resins are natural rosins such as gum rosin, tall oil rosin, wood rosin, etc.; modified rosins such as hydrogenated rosins, polymerized rosins, maleated rosins, etc., and rosin esters such as rosin glycerin ester, hydrogenated rosin glycerin ester, polymerized rosin glycerin ester, rosin pentaerythritol ester, hydrogenated rosin pentaerythritol ester, polymerized rosin pentaerythritol ester, etc. Specific examples of the terpene-containing resins are terpene resins such as $\alpha$-pinene, $\beta$-pinene, limonone, etc., and terpene phenolic resins such as an $\alpha$-pinene phenolic resin, a diterpene phenolic resin, etc. In addition to these, an aromatic hydrocarbon-modified terpene resin may be used. Specific examples of the synthetic resins usable as a tackifier are aliphatic, alicyclic and aromatic petroleum resins, a coumarone-indene resin, a styrene resin, a xylene resin, a rosin-modified phenolic resin, etc.

The amount of the tackifier for use per 100 parts by weight of the adhesive acrylic polymer is 0 to 100 parts by weight, preferably 5 to 70 parts by weight. Further, the amount thereof per 100 parts by weight of the adhesive rubber-based polymer is 1 to 100 parts by weight, preferably 5 to 70 parts by weight.

It is sufficient to mix the unsaturated polyester oligomer (A), the adhesive polymer (B) and the tackifier by stirring until the mixture is apparently homogeneous at room temperature. In order to improve the mixture state of these members, the mixing may be carried out by stirring the mixture under heat at a temperature of not higher than the boiling point of the solvent.

The curable adhesive composition of the present invention may optionally contain a pigment, a dye, an inorganic filler, an organic solvent, a metal powder such as a silver powder, a copper powder, a nickel powder, etc., carbon black, graphite, a silane-coupling agent, etc., in such an amount that the performance of the curable resin composition is not impaired.

The curable adhesive composition of the present invention may be used in the form of a sheet formed of itself, or in the form of an adhesive sheet prepared by applying it on paper or a cloth treated with silicone, on paper or a cloth treated with a low-adhesion resin such as polyethylene terephthalate-laminated paper, etc., or on a high-releasability film, sheet or tape such as a metal foil, plastic film, etc., drying it to remove the organic solvent as required and optionally cutting the resultant sheet. For the reinforcement of the sheet or a reduction in impact, the sheet may be lined with a nonwoven fabric of rayon, nylon, etc., a cloth of victors lawn, etc., or a urethane or acrylic foam. Further, these cloth, foam, etc., may be used as a core material, into which the composition of the present invention is impregnated. In order to prevent the substrate of the above sheet or the core material from remaining on an adhesion site with the adhesive composition, the substrate and the core material are required to be free from a change in properties caused by the treatment of heat cure, light irradiation, etc., or from prevention of the curing.

The adhesive sheet obtained as above is placed between two adherends of the same or different kind to glue the adherends together temporarily with good adhesion properties, and the curable adhesive composition is cured by treating it according to a type of the composition, whereby the adherends can be bonded to each other firmly.

When the polymerization initiator, promoter, etc., are micro-encapsulated, the microcapsules are fractured by exerting a force such as pressure with a press roll before or after the adhesive sheet is attached to an adherend. In some cases, the microcapsules are fractured under heat or irradiation with ultraviolet light, etc. Sustained release capsules are not required to be fractured.

When the curing is effected by anaerobical cure, the curing starts due to the function of the polymerization initiator soon after the sheet is attached to an adherend, and practically effective bond strength can be obtained several hours to about one week after the sheet is attached. In the heat cure, the curing is carried out by heating with hot air in an oven, etc., at a temperature between 80° C. and 150° C. for about 3 to about 20 minutes, or by contact-heating with a hot press at a temperature between 80° C. and 150° C. for about 0.5 seconds to about 5 minutes. In the photo-cure, at least one of two adherends is required to be light-permeable, and the curable adhesive composition is irradiated with light from the light-permeable adherend side. When the curable adhesive sheet has the curable adhesive composition on only one surface, i.e. when the curable adhesive composition is coated on one surface of a substrate, the curable adhesive composition is irradiated with light from either the light-permeable sheet substrate side or a light-permeable adherend side. In this manner, adherends can be bonded to each other firmly.

In the present invention, the term "light" includes visible light from the light sources of the sun, a fluorescent light, etc., ultraviolet light from the light sources of a high-pressure mercury lamp, an ultrahigh-pressure mercury lamp, a metal halide lamp, a carbon arc light, a xenon lamp, etc., γ-ray from cobalt 60 as a light source, X-ray from an X-ray generator, and electron beam from an electron beam accelerator. Of these, practically preferred are visible light, ultraviolet light and electron beam. Particularly preferred is visible light having a wavelength of 200 to 800 nm or ultraviolet light. When the curing is carried out by means of ultraviolet light, it is preferred to use the polymerization promoter in addition to the polymerization initiator from the viewpoint of curing efficiency as described above. The output of the light source differs depending upon the distance from the light source, irradiation area, types and amounts of the compositions, polymerization initiator and promoter, thickness of the adhesive composition layer, types and thicknesses of an adherend and a sheet substrate, and the like. In general, the curable adhesive composition is irradiated with an electron beam approximately at an exposure dose of 0.5 to 50 Mrad, or with ultraviolet light approximately at an exposure dose of 20 to 5,000 mJ/cm$^2$, approximately for 0.3 to 30 seconds.

The present invention further provides a combination of curable adhesive composition sheets (I) and (II), the sheet (I) being formed of a curable adhesive composition comprising an unsaturated polyester oligomer (A), an adhesive polymer (B), and a polymerization initiator, the sheet (II) being formed of a curable adhesive composition comprising an unsaturated polyester oligomer (A), an adhesive polymer (B) and a polymerization promoter, the combined compositions being cured by attaching the sheets (I) and (II) to each other.

The above unsaturated polyester oligomer (A), adhesive polymer (B) and polymerization initiator are the same as those specified with regard to the curable adhesive composition of the present invention.

The polymerization promoter is selected from tertiary amines such as N,N-dimethylbenzylamine, triethylamine, tributylamine, N,N-diethylaniline, N,N-dimethylaniline, N-phenyldiethanolamine, N-phenyldiisopropanolamine, dimethyl-p-toluidine, triethanolamine, 4-phenylmorpholine, etc.; and metal compounds including fatty acid salts such as laurate, naphthenate, octylate, oleate, octenate, etc., of a metal such as lithium, calcium, strontium, barium, cerium, zirconium, vanadium, molybdenum, manganese, iron, cobalt, nickel, copper, zinc, tin, lead, etc., resin acid salts such as rosin salt of such a metal, chelate compounds such as acetylacetonate complex salt of such a metal, etc. These polymerization promoter may be used alone or in combination as such. The amount of the polymerization promoter for use per 100 parts by weight of the total of the (A) unsaturated polyester oligomers in the sheets (I) and (II) is 0.1 to 15 parts by weight, preferably 0.5 to 5 parts by weight. When the combined curable adhesive compositions are anaerobically cured, it is preferred to use one member of the above tertiary amines, one member of the above metal compounds, or these two members in combination with the organic peroxide. The amount of the tertiary amine for use per 100 parts by weight of the organic peroxide is 1 to 100 parts by weight. The amount of the metal compound for use per 100 parts by weight of the organic peroxide is 0.01 to 10 parts by weight.

Each of the curable adhesive sheets (I) and (II) may be formed from the corresponding curable adhesive composition alone, or may be prepared by coating the corresponding curable adhesive composition on paper or a cloth treated with silicone or laminated with a low-adhesion resin or on a film having high releasability in the same manner as that for usual adhesive sheets. Further, each of the curable adhesive sheets (I) and (II) may be prepared by impregnating the corresponding curable adhesive composition into a nonwoven fabric, a cloth of victoria lawn, etc., a sheet of a urethane or acryl foam, and the like.

The combination of these curable adhesive sheets (I) and (II) are preferably used by attaching these two sheets immediately before use, attaching the combined sheets to an adherend and attaching the adherend and another adherend to each other, or by attaching the sheet (I) to an adherend, attaching the sheet (II) to another adherend and attaching the adherends to each other. The polymerization initiator and the polymerization promoter are diffused with time and work on reactive resins, whereby the curable adhesive composition is cured. The reaction starts when these two sheets are attached to each other, and the curing gradually proceeds to attain a high bond strength. In a combination of the curable adhesive sheets, the curing proceeds without applying light, heat, or the like.

The curable adhesive sheets (I) and (II) basically contain the unsaturated polyester oligomer (A) and the adhesive polymer (B). However, these components are not always required to be the same between the sheets (I) and (II). The mixing ratio of these components, the monomer compositions, and the like may be object-dependently changed between the sheets (I) and (II). Further, polyisocyanate may be incorporated one or both of the curable adhesive compositions of the sheets (I) and (II).

According to the present invention, there are provided a curable adhesive composition and a combination of curable adhesive composition sheets which have high adhesion properties when attached to an adherend and exhibit high bond strength after cured, which have a good balance between the adhesion properties before cured and the bond strength after cured, and which are almost free from offensive odor.

According to the present invention, the curable adhesive composition or a combination of the adhesive composition sheets can temporarily glue adherends together without temporary mechanical fixing, and firmly bond the adherends together with high bond strength after cured.

The present invention will be explained further in detail hereinafter by reference to Examples, in which "part" stands for "part by weight" and "%" stands for "% by weight".

Synthesis of Polyester Oligomer

| Synthesis of Polyester Oligomer | |
|---|---|
| Oligomer 1 | |
| Ethylene glycol | 2.0 parts |
| Hexahydrophthalic anhydride | 51.0 parts |
| Glycidyl methacrylate | 47.0 parts |
| N,N-dimethylbenzylamine | 0.9 part |
| Hydroquinone | 0.2 part |
| Ethyl acetate | 25.0 parts |

The above components were allowed to react under an air atmosphere at 80° C. for 10 hours, and the reaction mixture was cooled. 125 Parts of ethyl acetate was added to the reaction mixture to obtain a solution of polyester oligomer 1 (solid content 40%).

The following oligomers 2 to 9 were prepared in the same manner as that for the polyester oligomer 1.

| Oligomer 2 | |
|---|---|
| Ethylene glycol | 3.4 parts |
| Hexahydrophthalic anhydride | 50.3 parts |
| Glycidyl methacrylate | 46.3 parts |
| N,N-dimethylbenzylamine | 0.9 part |
| Hydroquinone | 0.2 part |
| Ethyl acetate | 25.0 parts |
| Oligomer 3 | |
| Ethylene glycol | 2.5 parts |
| Succinic anhydride | 40.3 parts |
| Glycidyl methacrylate | 57.2 parts |
| N,N-dimethylbenzylamine | 1.1 part |
| Hydroquinone | 0.2 part |
| Ethyl acetate | 25.0 parts |
| Oligomer 4 | |
| p-Hydroxybenzoic acid | 4.5 parts |
| Hexahydrophthalic anhydride | 49.7 parts |
| Glycidyl methacrylate | 45.8 parts |
| N,N-dimethylbenzylamine | 0.9 part |
| Hydroquinone | 0.2 part |
| Ethyl acetate | 25.0 parts |
| Oligomer 5 | |
| 1-Amino-2-propanol | 2.5 parts |
| Hexahydrophthalic anhydride | 50.7 parts |
| Glycidyl methacrylate | 46.8 parts |
| N,N-dimethylbenzylamine | 0.9 part |
| Hydroquinone | 0.2 part |
| Ethyl acetate | 25.0 parts |
| Oligomer 6 | |
| p-Hydroxybenzoic acid | 4.3 parts |
| Hexahydrophthalic anhydride | 48.5 parts |
| Phenyl glycidyl ether | 47.2 parts |
| N,N-dimethylbenzylamine | 0.9 part |
| Ethyl acetate | 25.0 parts |
| Oligomer 7 | |
| m-Xylenediamine | 4.5 parts |
| Hexahydrophthalic anhydride | 49.2 parts |
| Glycidyl methacrylate | 45.4 parts |
| N,N-dimethylbenzylamine | 0.9 part |
| Hydroquinone | 0.2 part |
| Ethyl acetate | 25.0 parts |
| Oligomer 8 | |
| Dibutylamine | 4.3 parts |
| Hexahydrophthalic anhydride | 49.3 parts |
| Glycidyl methacrylate | 45.5 parts |
| N,N-dimethylbenzylamine | 0.9 part |
| Hydroquinone | 0.2 part |
| Ethyl acetate | 25.0 parts |
| Oligomer 9 | |
| Dimethylaminoethyl methacrylate | 5.2 parts |

| -continued | |
|---|---|
| Hexahydrophthalic anhydride | 48.9 parts |
| Glycidyl methacrylate | 45.0 parts |
| N,N-dimethylbenzylamine | 0.9 part |
| Hydroquinone | 0.2 part |
| Ethyl acetate | 25.0 parts |

Synthesis of Adhesive Polymer

| Polymer 1 | |
|---|---|
| Butyl acrylate | 88.2 parts |
| Vinyl acetate | 5.6 parts |
| 2-Hydroxyethyl methacrylate | 6.2 parts |
| Azobisisobutyronitrile | 0.2 part |
| Ethyl acetate | 150.0 parts |

A polymer 1 was prepared under a nitrogen atmosphere as follows. 125 Parts of a mixture of the above composition was added dropwise to 125 parts of a mixture of the above composition which was heated to, and had a temperature of, 80° C. Then, the resultant mixture was refluxed under heat for 12 hours, and cooled to give a solution of an adhesive polymer (solid content 40%). The following polymers 2 and 3 were also prepared in the same manner as described here.

| Polymer 2 | |
|---|---|
| Butyl acrylate | 93.5 parts |
| Acrylic acid | 1.4 parts |
| 2-Hydroxyethyl methacrylate | 5.1 parts |
| Azobisisobutyronitrile | 0.2 part |
| Ethyl acetate | 150.0 parts |
| Polymer 3 | |
| Butyl acrylate | 92.0 parts |
| Acrylamide | 2.8 parts |
| 2-Hydroxyethyl methacrylate | 5.2 parts |
| Azobisisobutyronitrile | 0.2 part |
| Ethyl acetate | 150.0 parts |
| Polymer 4 | |
| Califlex TR-1101 | 40.0 parts |
| (SBS, rubber-containing polymer, supplied by Shell Chemical Co.) | |
| Ester gum H | 60.0 parts |
| hydrogenated rosin ester, tackifier, supplied by Arakawa Chemical Co.) | |
| Toluene | 135.0 parts |
| Methyl ethyl ketone | 15.0 parts |

The above components were stirred under a nitrogen atmosphere at 50° C. to form a solution of polymer 4 (solid content 40%).

| Polymer 5 | |
|---|---|
| Califlex TR-1107 | 61.5 parts |
| (SIS, rubber-containing polymer, supplied by Shell Chemical Co.) | |
| Ester gum H | 60.0 parts |
| hydrogenated rosin ester, tackifier, supplied by Arakawa Chemical Co.) | |
| Toluene | 135.0 parts |
| Methyl ethyl ketone | 15.0 parts |

The above components were stirred under a nitrogen atmosphere at 50° C. to form a solution of polymer 5 (solid content 40%).

| Polymer 6 | |
|---|---|
| Pale crepe rubber | 26.7 parts |
| Califlex TR-1107 | 40.0 parts |
| (SIS, rubber-containing polymer, supplied by Shell Chemical Co.) | |
| Ester gum H | 60.0 parts |
| (hydrogenated rosin ester, tackifier, supplied by Arakawa Chemical Industries Inc.) | |

-continued

| | | |
|---|---|---|
| Toluene | 70.4 | parts |
| N-Hexane | 64.5 | parts |
| Acetone | 15.1 | parts |

The above components were stirred under a nitrogen atmosphere at 50° C. to form a solution of polymer 6 (solid content 40%).

| Polymer 7 | | |
|---|---|---|
| Califlex TR-1101 | 60.0 | parts |
| (SBS, rubber-containing polymer, supplied by Shell Chemical Co.) | | |
| Toluene | 135.0 | parts |
| Methyl ethyl ketone | 15.0 | parts |

The above components were stirred under a nitrogen atmosphere at 50° C. to form a solution of polymer 7 (solid content 40%).

EXAMPLE 1

41.9 Parts of the solution of oligomer 1 and 58.1 parts of the solution of polymer 1 were fully mixed with each other, and 100 parts of the resultant mixture and 0.4 part of benzoyl peroxide were homogeneously mixed to give a curable adhesive composition.

The curable adhesive composition was coated on a silicone-treated polyethylene terephthalate film such that the dried coating had a thickness of 30 μm, and dried at 60° C. for 3 minutes to give a curable adhesive sheet. Separately, 0.2 part of tolylene diisocyanate was further added to the same curable adhesive composition as above, and a curable adhesive sheet was similarly obtained. This curable adhesive sheet was further aged at 50° C. for 3 days.

These two curable adhesive sheets were measured for adhesion properties before cured (peel adhesion strength, tack, and holding power) and a shear adhesion after cured, and Table 1 shows the results. The curing was effected under heat in an oven at 130° C. for 10 minutes. The methods for these measurements in this Example and other Examples are as follows.

(1) Peel adhesion strength before curing

A polyethylene terephthalate film having a thickness of 50 μm was attached to the adhesive surface of the curable adhesive sheet, and the sheet was cut to form a tape having a width of 25 mm. The silicone-treated polyethylene terephthalate film was peeled off, and the resultant adhesive surface was attached to a stainless steel (SUS304) plate of which the surface lad been polished with a #280 sand paper. After the tape was allowed to stand for 30 minutes, the tape was peeled off at a peel rate of 300 mm/minute, an angle of 180°, a temperature of 25° C. and a relative humidity of 65%.

(2) Tack before curing

The curable adhesive sheet was set on an inclined surface having an inclination angle of 30 degrees, and stainless steel balls were rolled down with an approach distance of 10 cm at 25° C. at a relative humidity of 65% to find out a largest ball which stopped rolling within 10 cm from the start of the adhesive surface. The balls had a size of 1/16 to 1 inch at intervals of 1/32 inch, and indicated with numbers obtained by multiplying the sizes by 32.

(3) Holding power before curing

A polyethylene terephthalate sheet having a thickness of 50 μm was attached to the adhesive surface of the curable adhesive sheet, and the sheet was cut to form a tape having a width of 25 mm and a length of 100 mm. Then, the silicone-treated polyethylene terephthalate film was peeled off, and the 25 mm×25 mm area of the resultant adhesive surface was attached to a stainless steel (SUS304) plate of which the surface had been polished with a #280 sand paper. And, the period of time (second) until the tape was peeled off at a load of 1 kg was measured at 40° C.

(4) Shear adhesion strength after curing

The curable adhesive sheet was cut to form two sheets having a width of 10 mm and a length of 10 mm. The adhesive surface of each of the resultant tapes was attached to one end portion of each of two aluminum plate sheets having a width of 50 mm, a length of 10 mm and a thickness of 0.5 mm, and the silicone-treated polyethylene terephthalate film was peeled off from each of the tapes. Then, the resultant adhesive surfaces were attached to each other, and the curable adhesive was cured according to the curing method specified in Table 1 and measured for a shear adhesion strength at a temperature of 25° C., a relative humidity of 65% and a tension rate of 5 mm/minute.

EXAMPLE 2

(Preparation of micro-encapsulated benzoyl peroxide)

While a mixture of 1 part of polyvinyl alcohol with 100 parts of water was maintained at 30° C. and stirred with a stirrer revolving at a rate of 225 rpm, a solution of 5 parts each of benzoyl peroxide and tolylene diisocyanate in 10 parts of xylene was added to, and dispersed in, the mixture. After 5 minutes, 1 part of tetraethylenepentamine was added, and the mixture was further continuously stirred for 2 hours to obtain a dispersion of benzoyl peroxide microcapsules each having a wall formed by a reaction of tolylene diisocyanate with tetraethylenepentamine, polyvinyl alcohol and water. 2 Parts of glutaraldehyde was added to 122 parts of a dispersion of the microcapsules, and the mixture was stirred for 2 hours. Then, 2 parts of N-(2-aminoethyl)-γ-aminopropyltrimethoxysilane was added, and ammonia water was added such that the dispersion had pH of about 11. The resultant mixture was further continuously stirred for 6 hours, and the microcapsules were recovered by filtering, washed with ethanol and dried at hot air at 50° C. to give micro-encapsulated benzoyl peroxide. The microcapsules had a benzoyl peroxide content of 20%, and had an average capsule diameter of 40 μm.

45.8 Parts of the solution of oligomer 2 and 54.2 parts of the solution of polymer 2 were fully mixed to prepare a resin solution, and 10 parts of the micro-encapsulated benzoyl peroxide, 0.1 part of cobalt naphthenate, 0.5 part of dimethyl-p-toluidine and 0.1 part of tolylene diisocyanate were homogeneously mixed with 100 parts of the resin solution to give a curable adhesive composition.

The curable adhesive composition was treated in the same manner as in Example 1 to give a curable adhesive sheet. The adhesion properties before curing were measured in the same manner as in Example 1 with taking care that the microcapsules were not fractured. Two aluminum plates were attached to each other in the same manner as in Example 1, pressed at 10 kg/cm² with a press roll, and allowed to stand at room temperature for 1 week to cure the curable adhesive composition fully. Then, the shear adhesion strength thereof was measured under the same conditions as those in Example 1. Further, the same measurement was conducted 2 months after the preparation of the curable adhesive sheet. Table 1 shows the results.

EXAMPLE 3

22.9 Parts of the solution of oligomer 3 and 77.1 parts of the solution of polymer 3 were fully mixed to prepare a resin solution, and 0.4 part of 2-hydroxy-2-methylpropiophenone and 0.1 part of tolylene diisocyanate were homogeneously mixed with 100 parts of the resin solution to give a curable adhesive composition.

The curable adhesive composition was treated in the same manner as in Example 1 to give a curable adhesive sheet. The curable adhesive sheet was measured for adhesion properties before curing and a shear adhesion strength after curing. In the measurement of the shear adhesion strength, an acrylic plate having a length of 50 mm, a width of 10 mm and a thickness of 1.0 mm was used in place of the aluminum plate. And, the curing was carried out by irradiation with ultraviolet light under a 2 kw high-pressure mercury lamp at a distance of 15 cm for 15 seconds. Table 1 shows the results.

EXAMPLE 4

38.0 Parts of the solution of oligomer 4 and 62.0 parts of the solution of polymer 2 were fully mixed to prepare a resin solution, and 0.4 part of benzoyl peroxide and 0.2 part of tolylene diisocyanate were homogeneously mixed with 100 parts of the resin solution. Further, 1 part of benzoyl peroxide, 0.1 part of cobalt naphthenate, 0.5 part of 4-phenylmorpholine and 0.2 part of tolylene diisocyanate were homogeneously mixed with 100 parts of the same resin solution as above, and furthermore, 0.4 part of 2-hydroxy-2-methylpropiophenone and 0.2 part of tolylene diisocyanate were homogeneously mixed with 100 parts of the same resin solution above. As a result, three curable adhesive compositions were obtained.

These three curable adhesive compositions were treated in the same manner as in Example 1 to obtain three curable adhesive sheets. These curable adhesive sheets were measured for adhesion properties before curing and shear adhesion strength after curing. The curing was carried out by a heat cure, anaerobical cure or photo-cure method. The heating cure was carried out with a hot press at 130° C. at 50 kg/cm$^2$ for 10 seconds. The anaerobical cure and the photo-cure were carried out in the same manner as in Examples 2 and 3. Table 1 shows the results.

In addition, a curable adhesive sheet was also prepared from the same resin solution as above without adding any initiator, etc., and the adhesive surface of the adhesive sheet was attached to a stainless steel sheet in a contact width of 5 mm in the same manner as in the measurement for a holding power in Example 1. Then, the curable adhesive sheet was irradiated with an electron beam at 5 Mrad from the polyethylene terephthalate film side by means of an electrocurtain type electron beam irradiation apparatus, and the sheet was measured for a shear adhesion strength. In this case, the polyethylene terephthalate film was fractured.

EXAMPLE 5

26.7 Parts of the solution of oligomer 5 and 73.3 parts of the solution of polymer 3 were fully mixed to prepare a resin solution. And, 0.4 part of tert-butylperoxy-2-ethylhexanoate and 0.2 part of tolylene diisocyanate were homogeneously mixed with 100 parts of the resin solution to give a curable adhesive composition.

The curable adhesive composition was treated in the same manner as in Example 1 to obtain a curable adhesive sheet, and the sheet was measured for adhesion properties before curing and a shear adhesion strength after curing in the same manner as in Example 1. The curing was carried out by a heat cure method. Table 1 shows the result.

EXAMPLE 6

21.2 Parts of the solution of oligomer 4, 21.7 parts of the solution of oligomer 6 and 57.1 parts of the solution of polymer 3 were fully mixed to prepare a resin solution. And, 0.4 part of benzoyl peroxide was homogeneously mixed with 100 parts of the resin solution, and the resultant curable adhesive composition was treated in the same manner as in Example 1 to give a curable adhesive sheet. Further, 0.1 part of tolylene diisocyanate was homogeneously mixed with 100 parts of the same resin solution as above to give a curable adhesive composition.

The curable adhesive resin composition was treated in the same manner as in Example 1 to give a curable adhesive sheet.

The above two curable adhesive sheets were measured for adhesion properties before curing and a shear adhesion strength after curing. The curing was carried out by a heat cure method in the same manner as in Example 4. Table 1 shows the results.

EXAMPLE 7

42.9 Parts of the solution of oligomer 7 and 57.1 parts of the solution of polymer 3 were fully mixed to prepare a resin solution. And, 0.4 part of benzoyl peroxide and 0.1 part of tolylene diisocyanate were homogeneously mixed with 100 parts of the resin solution, and a curable adhesive sheet was obtained in the same manner as in Example 1.

The curable adhesive sheet was measured for adhesion properties before curing and a shear adhesion strength after curing. The curing was carried out by a heat cure method in the same manner as in Example 4. Table 1 shows the results.

EXAMPLE 8

Example 7 was repeated except that the solution of oligomer 7 was changed to the solution of oligomer 8, and the resultant adhesive sheet was measured for adhesion properties before curing and a shear adhesion strength after curing. The curing was carried out by a heat cure method in the same manner as in Example 4. Table 1 shows the results.

EXAMPLE 9

Example 7 was repeated except that the solution of oligomer 7 was changed to the solution of oligomer 9, and the resultant adhesive sheet was measured for adhesion properties before curing and a shear adhesion strength after curing. The curing was carried out by a heat cure method in the same manner as in Example 4. Table 1 shows the results.

TABLE 1

| Example | TDI | Peel adhesion strength (g/25 cm) | Tack | Holding power (second) | Curing method | Shear adhesion strength (kg · cm$^2$) |
|---|---|---|---|---|---|---|
| 1 | yes | 1,820 | 12 | 1,570 | H | 54.3 |
|   | no  | 1,680 | 8  | >24 hours | H | 38.6 |
| 2 | yes | 1,920 | 15 | >24 hours | A | 45.2 |
|   | no  | 1,850 | 13 | >24 hours | A | 40.8 |
| 3 | yes | 2,610 | 16 | >24 hours | U | 30.5 |
| 4 | yes | 2,270 | 9  | >24 hours | H | 47.0 |
|   | yes | 2,150 | 7  | >24 hours | A | 41.0 |
|   | yes | 2,220 | 9  | >24 hours | U | 27.2 |
| 5 | yes | 2,790 | 10 | >24 hours | H | 39.8 |
| 6 | no  | 2,360 | 11 | 7,250 | H | 36.6 |
|   | yes | 2,250 | 8  | >24 hours | H | 33.0 |
| 7 | yes | 1,680 | 10 | >24 hours | H | 48.5 |
| 8 | yes | 1,630 | 11 | >24 hours | H | 32.4 |
| 9 | yes | 1,750 | 10 | >24 hours | H | 40.1 |

Notes:
TDI = tolylene diisocyanate
yes = contained
no = not contained
Curing methods: H = heat cure, A = anaerobical cure U = photo-cure
First data in Example 2 was obtained just after the preparation of curable adhesive sheet, and second data was obtained 2 months after the preparation of curable adhesive sheet.

Table 1 shows that the curable adhesive composition of the present invention has a peel adhesion strength of not less than 1,500 g/25 mm, a tack of not less than 7 and a holding power of not less than 1,000 seconds even without polyisocyanate before it is cured. Further, the curable adhesive composition of the present invention has a shear adhesion strength of not less than 30 kg/cm$^2$ when it is heat-cured or anaerobically cured, and a shear adhesion strength of not less than 25 kg/cm$^2$ when it is photo-cured. Therefore, the curable adhesive composition of the present invention is excellent in adhesion properties before cured and bond strength after cured.

Moreover, the curable adhesive composition of the present invention is not only excellent in respect of ease in carrying out the reaction and freedom from offensive odor in comparison with conventional adhesive compositions prepared by introducing an unsaturated group into a polymer, but also has properties which stand comparison with those of such conventional adhesive compositions. Furthermore, the addition of a proper amount of polyisocyanate improved the cohesive power and provided a holding power with which no deviation occurred even after 24 hours without impairing the peel adhesion strength and tack before curing and the shear adhesion strength after curing.

EXAMPLE 10

41.9 Parts of the solution of oligomer 1 and 58.1 parts of the solution of polymer 1 were fully mixed to prepare a resin solution, and 8 parts of YS Polyster 2100 (terpene phenolic resin, tackifier, supplied by Yasuhara Chemical Co., Ltd.) and 0.4 part of benzoyl peroxide were homogeneously mixed with 100 parts of the resin solution. Further, 0.2 part of tolylene diisocyanate was added, and the resultant solution was coated on a silicone-treated polyethylene terephthalate film such that the dried coating had a thickness of 30 μm. The resultant coating was dried at 60° C. for 3 minutes to give a curable adhesive sheet. The curable adhesive sheet was further aged at 50° C. for 3 days, and measured for adhesion properties (peel adhesion strength, tack and holding power) before curing and a shear adhesion strength and peel adhesion strength after curing in the following manner. Table 2 shows the results. The curing was carried out by heating with a hot press at 130° C. for 30 seconds.

(1) Peel adhesion strength before curing

A polyethylene terephthalate film having a thickness of 50 μm was attached to the adhesive surface of the curable adhesive sheet, and the sheet was cut to form a tape having a width of 25 mm. The silicone-treated polyethylene terephthalate film was peeled off, and the resultant adhesive surface was attached to a polypropylene sheet of which the surface had been treated with toluene. After the tape was allowed to stand for 30 minutes, the tape was peeled off at a peel rate of 300 mm/minute, an angle of 180°, a temperature of 25° C. and a relative humidity of 65 %.

(2) Tack before curing

The tack before curing was measured in the same manner as in Example 1.

(3) Holding power before curing

A polyethylene terephthalate sheet having a thickness of 50 μm was attached to the adhesive surface of the curable adhesive sheet, and the sheet was cut to form a tape having a width of 25 mm and a length of 100 mm. Then, the silicone-treated polyethylene terephthalate film was peeled off, and the 25 mm × 25 mm area of the resultant adhesive surface was attached to a 2 mm thick polypropylene sheet of which the surface had been treated with toluene. And, the period of time until the tape was peeled off at a load of 1 kg was measured at 40° C.

(4) Shear adhesion strength after curing

The curable adhesive sheet was cut to form two sheets having a width of 10 mm and a length of 10 mm. The adhesive surface of each of the resultant tapes was attached to one end portion of each of two polypropylene sheets having a width of 50 mm, a length of 10 mm and a thickness of 0.5 mm, and the silicone-treated polyethylene terephthalate film was peeled off from each of the tapes. Then, the resultant adhesive surfaces were attached to each other, and the curable adhesive was cured with a hot press at 130° C. for 30 seconds and measured for a shear adhesion strength at a temperature of 25° C., a relative humidity of 65 % and a tension rate of 5 mm/minute.

(5) Peel adhesion strength

The adhesive sheet was cut to form a tape having a width of 25 mm, and the adhesive surface of the tape was attached to a polypropylene sheet having a length of 100 mm, a width of 25 mm and a thickness of 1 mm. The adhesive was cured by heating it with a hot press at 130° C. for 30 seconds, and the tape was peeled at a tension rate of 300 mm/minute at a temperature of 25° C. at a relative humidity of 65 %.

EXAMPLE 11

(Preparation of micro-encapsulated benzoyl peroxide)

While a mixture of 1 part of polyvinyl alcohol with 100 parts of water was maintained at 30° C. and stirred with a stirrer revolving at a rate of 225 rpm, a solution of 5 parts each of benzoyl peroxide and tolylene diisocyanate in 10 parts of xylene was added to, and dispersed in, the mixture. After 5 minutes, 1 part of tetraethylenepentamine was added, and the mixture was further continuously stirred for 2 hours to obtain a dispersion of benzoyl peroxide microcapsules each having a wall formed by a reaction of tolylene di isocyanate with tetraethylenepentamine, polyvinyl alcohol and water. 2 Parts of glutaraldehyde was added to 122 parts of a dispersion of the microcapsules, and the mixture was stirred for 2 hours. Then, 2 parts of N-(2-aminoethyl)-γ-aminopropyltrimethoxysilane was added, and ammonia water was added such that the dispersion had pit of about 11. The resultant mixture was further continuously stirred for 6 hours, and the microcapsules were recovered by filtering, washed with ethanol and dried at hot air at 50° C. to give micro-encapsulated benzoyl peroxide. The microcapsules had a benzoyl peroxide content of 20%, and had an average capsule diameter of 40 μm.

45.8 Parts of the solution of oligomer 2 and 54.2 parts of the solution of polymer 2 were fully mixed to prepare a resin solution. And, 8 parts of YS Polyester 2100 (terpene phenolic resin, tackifier, supplied by Yasuhara Chemical Co., Ltd.), 10 parts of the micro-encapsulated benzoyl peroxide, 0.1 part of cobalt naphthenate, 0.5 part of dimethyl-p-toluidine and 0.1 part of tolylene diisocyanate were homogeneously mixed with 100 parts of the resin solution, and a curable adhesive sheet was prepared in the same manner as in Example 1. The adhesion properties of the curable adhesive sheet before curing were measured in the same manner as in Example 1 with taking care that the microcapsules were not fractured. Two polypropylene sheets were attached to each other in the same manner as in Example 1, pressed at 10 kg/cm² with a press roll, and allowed to stand at room temperature for 1 week to cure the curable adhesive composition fully. Then, the shear adhesion strength thereof was measured under the same conditions as those in Example 10. Table 2 shows the results.

EXAMPLE 12

22.9 Parts of the solution of oligomer 3 and 77.1 parts of the solution of polymer 3 were fully mixed to prepare a resin solution. And, 8 parts of YS Polyster (terpene phenolic resin, tackifier, supplied by Yasuhara Chemical Co., Ltd.), 0.4 part of 2-hydroxy-2-methylpropiophenone and 0.1 part of tolylene diisocyanate were homogeneously mixed with 100 parts of the resin solution, and a curable adhesive sheet was obtained in the same manner as in Example 10. The curable adhesive sheet was measured for adhesion properties before curing and a shear adhesion strength after curing. The curing was carried out by irradiation with ultraviolet light by means of a 2 kw high-pressure mercury lamp at a distance of 15 cm for 15 seconds. Table 2 shows the results.

EXAMPLES 13–15

Examples 10 to 12 were repeated except that the testing sheets which were to be bonded were changed from the polypropylene sheets to polycarbonate sheets. Table 2 shows the results.

EXAMPLES 16–17

Examples 10 and 13 were repeated except that the YS Polyester 2100 as a tackifier was replaced with Petrosin 100 (aromatic petroleum resin, supplied by Mitsui Petrochemical Industries, Ltd.). Table 2 shows the results.

Comparative Examples 1–6

Examples 10 to 15 were repeated except that the YS Polyester 2100 was not used. Table 2 shows the results.

TABLE 2

|  | Before curing |  |  | After curing |  |
| --- | --- | --- | --- | --- | --- |
|  | Peel adhesion strength (g/25 mm wide) | Tack | Holding power | Shear adhesion strength (kg/cm²) | Peel adhesion strength (g/25 mm wide) |
| Example |  |  |  |  |  |
| 10 | 1,630 | 5 | NC | 8.4 | 0.45 |
| 11 | 1,510 | 5 | NC | 7.3 | 0.44 |
| 12 | 1,600 | 5 | NC | 7.6 | 0.38 |
| 13 | 1,880 | 5 | NC | 15.5 | 1.46 |
| 14 | 1,770 | 5 | NC | 14.6 | 1.89 |
| 15 | 1,870 | 5 | NC | 16.3 | 1.51 |
| 16 | 1,560 | 5 | NC | 7.0 | 0.53 |
| 17 | 1,850 | 5 | NC | 16.4 | 1.55 |
| Comparative Example |  |  |  |  |  |
| 1 | 1,420 | 10 | NC | 3.4 | 0.05 |
| 2 | 1,250 | 11 | NC | 2.5 | 0.09 |
| 3 | 1,440 | 10 | NC | 3.5 | 0.06 |
| 4 | 1.750 | 11 | NC | 7.6 | 0.45 |
| 5 | 1,840 | 12 | NC | 6.8 | 0.51 |
| 6 | 1,730 | 10 | NC | 8.0 | 0.39 |

Note:
NC = No deviation occurred for more than 24 hours.

Table 2 shows adhesion properties of the curable adhesive composition of the present before curing, in which the peel adhesion strength is more than 1,500 g/25 mm even with a plastic substrate, the tack is not less than 5 and the holding power is not less than 24 hours, and these data are as good as those of adhesive compositions into which no tackifier is incorporated. On the other hand, the shear adhesion strength and peel adhesion strength of the curable adhesive composition of the present invention are far higher than those of adhesive compositions into which no tackifier is incorporated. The present invention has thus made it possible to provide a curable adhesive composition which is excellent in both adhesion properties when attached to an adherend and the bond strength after cured, which has a good balance between the adhesion properties and the bond strength and which has excellent suitability to plastic substrates.

EXAMPLE 18

41.9 Parts of the solution of oligomer 1 and 58.1 parts of the solution of polymer 4 were fully mixed to prepare a resin solution, and 0.4 part of benzoyl peroxide was homogeneously mixed with 100 parts of the resin solution. The resultant solution was coated on a silicone-treated polyethylene terephthalate film such that the dried coating had a thickness of 30 µm. The resultant coating was dried at 60° C. for 3 minutes to give a curable adhesive sheet. The curable adhesive sheet was measured for adhesion properties (peel adhesion strength, tack and holding power) before curing and a shear adhesion strength after curing in the same manner as in Example 1. The curable adhesive sheet was also measured for a peel adhesion strength after curing in the same manner as in Example 10 except that the polypropylene sheet was replaced with an aluminum plate having a thickness of 100 µm. Table 3 shows the results. The thermal curing was carried out by heating with a hot press at 130° C. at a pressure of 50 kg/cm$^2$ for 10 seconds.

EXAMPLE 19

(Preparation of micro-encapsulated benzoyl peroxide)

While a mixture of 1 part of polyvinyl alcohol with 100 parts of water was maintained at 30° C. and stirred with a stirrer revolving at a rate of 225 rpm, a solution of 5 parts each of benzoyl peroxide and tolylene diisocyanate in 10 parts of xylene was added to, and dispersed in, the mixture. After 5 minutes, 1 part of tetraethylenepentamine was added, and the mixture was further continuously stirred for 2 hours to obtain a dispersion of benzoyl peroxide microcapsules each having a wall formed by a reaction of tolylene diisocyanate with tetraethylenepentamine, polyvinyl alcohol and water. 2 Parts of glutaraldehyde was added to 122 parts of a dispersion of the microcapsules, and the mixture was stirred for 2 hours. Then, 2 parts of N-(2-aminoethyl)-γ-aminopropyltrimethoxysilane was added, and ammonia water was added such that the dispersion had pH of about 11. The resultant mixture was further continuously stirred for 6 hours, and the microcapsules were recovered by filtering, washed with ethanol and dried at hot air at 50° C. to give micro-encapsulated benzoyl peroxide. The microcapsules had a benzoyl peroxide content of 20%, and had an average capsule diameter of 40 µm.

41.9 Parts of the solution of oligomer 1 and 58.1 parts of the solution of polymer 4 were fully mixed to prepare a resin solution. And, 10 parts of the micro-encapsulated benzoyl peroxide, 0.1 part of cobalt naphthenate and 0.5 part of dimethyl-p-toluidine were homogeneously mixed with 100 parts of the resin solution, and a curable adhesive sheet was prepared in the same manner as in Example 1. The adhesion properties of the curable adhesive sheet before curing were measured in the same manner as in Example 18 with taking care that the microcapsules were not fractured. Two aluminum sheets were attached to each other in the same manner as in Example 1, pressed at 10 kg/cm$^2$ with a press roll, and allowed to stand at room temperature for 1 week to cure the curable adhesive composition fully. Then, the resultant product of the aluminum sheets was measured under the same conditions as those in Example 18. Table 3 shows the results.

EXAMPLE 20

22.9 Parts of the solution of oligomer 1 and 77.1 parts of the solution of polymer 4 were fully mixed to prepare a resin solution, and 0.4 part of 2-hydroxy-2-methylpropiophenone was homogeneously mixed with 100 parts of the resin solution. And a curable adhesive sheet was prepared in the same manner as in Example 1. The curable adhesive sheet was measured for adhesion properties before curing and a shear adhesion strength after curing. In the measurement of the shear adhesion strength, an acryl plate having a length of 50 mm, a width of 10 mm and a thickness of 1.0 mm was used in place of the aluminum plate. In the measurement of the peel adhesion strength, a polyethylene terephthalate sheet having a length of 100 mm, a width of 25 mm and a thickness of 100 µm was used in place of the aluminum sheet. And, the curing was carried out by irradiation with ultraviolet light under a 2 kw high-pressure mercury lamp at a distance of 15 cm for 15 seconds. Table 3 shows the results.

EXAMPLE 21

38.0 Parts of the solution of oligomer 1 and 62.0 parts of the solution of polymer 5 were fully mixed to prepare a resin solution, and 0.4 part of benzoyl peroxide was homogeneously mixed with 100 parts of the resin solution. Further, 1 part of benzoyl peroxide, 0.1 part of cobalt naphthenate and 0.5 part of 4-phenylmorpholine were homogeneously mixed with 100 parts of the same resin solution as above, and furthermore, 0.4 part of 2-hydroxy-2-methylpropiophenone was homogeneously mixed with 100 parts of the same resin solution above. And, three curable adhesive sheets were obtained in the same manner as in Example 18. These curable adhesive sheets were measured for adhesion properties before curing and bonding properties after curing. The curing was carried out by a heat cure, anaerobical cure or photo-cure method. The heating cure was carried out with a hot press at 130° C. at 50 kg/cm$^2$ for 10 seconds. The anaerobical cure and the photo-cure were carried out in the same manner as in Examples 19 and 20. Table 3 shows the results.

In addition, a curable adhesive sheet was also prepared from the same resin solution as above without adding any initiator, etc., and the adhesive surface of the adhesive sheet was attached to a stainless steel sheet in a contact width of 5 mm in the same manner as in the measurement for a holding power before curing. Then, the curable adhesive sheet was irradiated with an electron beam at 5 Mrad from the polyethylene terephthalate film side by means of an electrocurtain type electron beam irradiation apparatus, and the sheet was measured for a shear adhesion strength. In this case, the polyethylene terephthalate film was fractured.

EXAMPLE 22

26.7 Parts of the solution of oligomer 1 and 73.3 parts of the solution of polymer 6 were fully mixed to prepare a resin solution, and 0.4 part of benzoyl peroxide was homogeneously mixed with 100 parts of the resin solution. Further, 1 part of benzoyl peroxide, 0.1 part of cobalt naphthenate and 0.5 part of 4-phenylmorpholine were homogeneously mixed with 100 parts of the same resin solution as above, and furthermore, 0.4 part of 2-hydroxy-2-methylpropiophenone was homogeneously mixed with 100 parts of the same resin solution above. And, from the resultant three curable adhesive compositions, three curable adhesive sheets were obtained in the same manner as in Example 18. These curable adhesive sheets were measured for adhesion properties before curing and bonding properties after curing. The curing was carried out by a heat cure, anaerobical cure or photo-cure method. The heating cure was carried out with a hot press at 130° C. at 50 kg/cm$^2$ for 10 seconds. The anaerobical cure and the photo-cure were carried out in the same manner as in Examples 19 and 20. Table 3 shows the results.

EXAMPLE 23

41.9 Parts of one of the solutions of oligomers 3 to 6 and 58.1 parts of the solution of polymer 4 were fully mixed to prepare a resin solution, and 0.4 part of benzoyl peroxide was homogeneously mixed with 100 parts of the resin solution. Then, four curable adhesive sheets were obtained in the same manner as in Example 18. These curable adhesive sheets were measured for adhesion properties before curing and bonding properties after curing. The curing was carried out with a hot press at 130° C. at 50 kg/cm$^2$ for 10 seconds. Table 3 shows the results.

Comparative Example 7

38.0 Parts of the solution of oligomer 4 and 62.0 parts of the solution of polymer 2 were fully mixed to prepare a resin solution, and 0.4 part of benzoyl peroxide and 0.2 part of tolylene diisocyanate were homogeneously mixed with 100 parts of the resin solution. Further, 1 part of benzoyl peroxide, 0.1 part of cobalt naphthenate, 0.5 part of 4-phenylmorpholine and 0.2 part of tolylene diisocyanate were homogeneously mixed with 100 parts of the same resin solution as above, and furthermore, 0.4 part of 2-hydroxy-2-methylpropiophenone and 0.2 part of tolylene diisocyanate were homogeneously mixed with 100 parts of the same resin solution above. And, from the resultant three curable adhesive compositions, three curable adhesive sheets were obtained in the same manner as in Example 18. These curable adhesive sheets were measured for adhesion properties before curing and bonding properties after curing. The curing was carried out by a heat cure, anaerobical cure or photo-cure method. The heating cure was carried out with a hot press at 130° C. at 50 kg/cm$^2$ for 10 seconds. The anaerobical cure and the photo-cure were carried out in the same manner as in Examples 19 and 20. Table 3 shows the results.

Comparative Example 8

38.0 Parts of the solution of oligomer 4 and 62.0 parts of the solution of polymer 7 were fully mixed to prepare a resin solution, and 0.4 part of benzoyl peroxide was homogeneously mixed with 100 parts of the resin solution. Further, 1 part of benzoyl peroxide, 0.1 part of cobalt naphthenate and 0.5 part of 4-phenylmorpholine were homogeneously mixed with 100 parts of the same resin solution as above, and furthermore, 0.4 part of 2-hydroxy-2-methylpropiophenone was homogeneously mixed with 100 parts of the same resin solution above. And, from the resultant three curable adhesive compositions, three curable adhesive sheets were obtained in the same manner as in Example 18. These curable adhesive sheets were measured for adhesion properties before curing and bonding properties after curing. The curing was carried out by a heat cure, anaerobical cure or photo-cure method. The heating cure was carried out with a hot press at 130° C. at 50 kg/cm$^2$ for 10 seconds. The anaerobical cure and the photo-cure were carried out in the same manner as in Examples 19 and 20. Table 3 shows the results.

TABLE 3

| | Before curing | | | After curing | | |
|---|---|---|---|---|---|---|
| | Peel adhesion strength (g/25 mm) | Tack | Holding power | Curing method | Shear adhesion strength (kg/cm$^2$) | Peel adhesion strength (g/25 mm) |
| Example | | | | | | |
| 18 | 1,880 | 5 | >24 hours | H | 38.6 | 4,230 |
| 19 | 1,820 | 5 | >24 hours | A | 42.2 | 4,500 |
| 20 | 1,910 | 6 | >24 hours | U | 25.5 | 2,680 |
| 21 | 1,270 | 9 | >24 hours | H | 31.0 | 3,020 |
| | 1,250 | 8 | >24 hours | A | 36.1 | 3,230 |
| | 1,220 | 8 | >24 hours | U | 21.2 | 2,150 |
| 22 | 1,490 | 6 | >24 hours | H | 33.8 | 3,060 |
| | 1,550 | 6 | >24 hours | A | 36.1 | 3,390 |
| | 1,520 | 6 | >24 hours | U | 20.2 | 2,080 |
| 23 | 1,880 | 8 | >24 hours | H | 44.6 | 4,310 |
| | 2,290 | 10 | >24 hours | H | 39.8 | 4,460 |
| | 2,150 | 8 | >24 hours | H | 41.1 | 4,150 |
| | 2,220 | 9 | >24 hours | H | 37.2 | 4,220 |
| Comparative Example | | | | | | |
| 7 | 2,270 | 9 | >24 hours | H | 47.0 | 1,660 |
| | 2,150 | 7 | >24 hours | A | 41.1 | 1,780 |
| | 2,220 | 9 | >24 hours | U | 27.2 | 1,260 |
| 8 | 850 | 10 | >24 hours | H | 43.0 | 1,520 |
| | 950 | 9 | >24 hours | A | 41.1 | 1,460 |

TABLE 3-continued

| | Before curing | | After curing | | |
|---|---|---|---|---|---|
| Peel adhesion strength (g/25 mm) | Tack | Holding power | Curing method | Shear adhesion strength (kg/cm$^2$) | Peel adhesion strength (g/25 mm) |
| 800 | 11 | >24 hours | U | 21.3 | 1,110 |

Notes:
In Example 23, first data was obtained by the use of oligomer 3, second data by the use of oligomer 4, third data by the use of oligomer 5, and fourth data by the use of oligomer 6.
Curing methods: H = heat cure, A = anaerobical cure, and U = photo-cure (UV light)

Table 3 shows that the curable adhesive composition of the present invention has a peel adhesion strength of not less than 1,200 g/25 mm, a tack of not less than 4 and a holding power of not less than 24 hours before it is cured. Further, the curable adhesive composition of the present invention has a shear adhesion strength of not less than 30 kg/cm$^2$ when anaerobically cured, a shear adhesion strength of not less than 20 kg/cm$^2$ when photo-cured, a peel adhesion strength of not less than 3,000 g/25 mm when heat-cured or anaerobically cured, and a peel adhesion strength of not less than 2,000 g/25 mm when photo-cured. Therefore, the curable adhesive composition of the present invention is excellent both in adhesion properties before curing and bond strength after curing, and it is particularly excellent in peel adhesion strength after curing.

Further, the curable adhesive composition of the present invention is not only excellent in respect of case in carrying out the reaction and freedom from offensive odor in comparison with conventional adhesive compositions prepared by introducing an unsaturated group into a polymer, but also has properties which stand comparison with those of such conventional adhesive compositions.

EXAMPLE 24

45.8 Parts of the solution of oligomer 2 and 54.2 parts of the solution of polymer 2 were fully mixed to prepare a resin solution, and 0.4 part of benzoyl peroxide was homogeneously mixed with 100 parts of the resin solution. The resultant mixture was coated on a silicone-treated polyethylene terephthalate film such that the dried coating had a thickness of 30 μm, and the coating was dried at 60° C. for 3 minutes to give a curable adhesive sheet (I). Separately, the above procedure was repeated except that 0.4 part of the benzoyl peroxide was replaced with 0.4 part of diethanoianiline, whereby a curable adhesive sheet (II) was obtained.

The above curable adhesive sheets (I) and (II) were respectively measured for adhesion properties (peel adhesion strength, tack and holding power) before curing, and the combined sheets (I) and (II) were measured for a shear adhesion strength after cured. Table 4 shows the results. The curing was carried out by attaching these two sheets (I) and (II) together and allowing the attached sheet to stand for a while.

EXAMPLE 25

Example 24 was repeated except that 0.2 part of tolylene diisocyanate was further incorporated into each of the resin solutions, whereby curable adhesive sheets (I) and (II) were obtained. The curable adhesive sheet (I) was measured for adhesion properties before curing. These sheets were attached together, allowed to stand for a while and measured for a shear adhesion strength after curing. Table 4 shows the results.

EXAMPLE 26

22.9 Parts of the solution of oligomer 3 and 77.1 parts of the solution of polymer 3 were fully mixed to prepare a resin solution, and 0.4 part of benzoyl peroxide and 0.2 part of tolylene diisocyanate were homogeneously mixed with 100 parts of the resin solution. A curable adhesive sheet (I) was obtained from this resin solution in the same manner as in Example 24, and aged at 50° C. for 3 days. Separately, the above procedure was repeated except that 0.4 part of the benzoyl peroxide was replaced with 0.4 part of diethanoianiline, whereby a curable adhesive sheet (II) was obtained. The curable adhesive sheet (I) was measured for adhesion properties before curing. These curable adhesive sheets (I) and (II) were attached together, allowed to stand for a while and measured for a shear adhesion strength after curing. Table 4 shows the results.

EXAMPLE 27

45.8 Parts of the solution of oligomer 2 and 54,2 parts of the solution of polymer 2 were fully mixed to prepare a resin solution, and 0.4 part of cumene hydroxyperoxide and 0.2 part of tolylene diisocyanate were homogeneously mixed with 100 parts of the resin solution. The resultant mixture was coated on a silicone-treated polyethylene terephthalate film such that the dried coating had a thickness of 30 μm, and the coating was dried at 60° C. for 30 minutes to give a curable adhesive sheet (I). The curable adhesive sheet (I) was aged at 50° C. for 3 days. Separately, the above procedure was repeated except that 0.4 part of the cumene hydroxyperoxide was replaced with 0.4 part of diethanol aniline and 0.05 part of cobalt naphthenate, whereby a curable adhesive sheet (II) was obtained. The curable adhesive sheet (I) was measured for adhesion properties before curing. These curable adhesive sheets (I) and (II) were attached together, allowed to stand for a while and measured for a shear adhesion strength after curing. Table 4 shows the results.

EXAMPLE 28

Example 27 was repeated except for the following: For a curable adhesive sheet (I), 0.4 part of the cumene hydroxyperoxide was replaced with 0.4 part of lauryl peroxide, and for a curable adhesive sheet (II), 0.05 part of cobalt naphthenate was not used, i.e. 0.04 part of diethanol aniline alone was mixed with the same resin solution as above. The curable adhesive sheet (I) was measured for adhesion properties before curing. These curable adhesive sheets (I) and (II) were attached together, allowed to stand for a while and measured for a shear adhesion strength after curing. Table 4 shows the results.

TABLE 4

| Example | Before curing Peel adhesion strength (g/25 mm) | Tack | Holding power | After curing Shear adhesion strength (kg/cm²) |
|---|---|---|---|---|
| 24 | 1,830 (1,950) | 13 (13) | 2,260 (1,780) | 54.1 |
| 25 | 1,680 | 7 | >24 hours | 30.8 |
| 26 | 2,510 | 12 | >24 hours | 31.6 |
| 27 | 1,620 | 12 | >24 hours | 38.6 |
| 28 | 1,870 | 13 | >24 hours | 35.8 |

Note:
In Example 24 in the column of "peel adhesion strength", the parenthesized data shows measurement value of curable adhesive sheet (II).

Table 4 shows that the curable adhesive sheet of the present invention before curing has a peel adhesion strength of not less than 1,500 g/25 mm, a tack of not less than 7 and a holding power of not less than 1,000 seconds even without incorporating polyisocyanate. Further, it has a shear adhesion strength of not less than 30 kg/cm² after cured. Therefore, it is excellent both in adhesion properties before curing and in bond strength after curing. A combination of the curable adhesive sheets of the present invention can be preserved in the form of individual sheets before use, and as a result, the components which undergoes a curing reaction do not work before the two sheets are attached together. Therefore, a combination of the curable adhesive sheets of the present invention remarkably improves the conventional preservability issue. Further, the incorporation of a proper amount of polyisocyanate achieves a holding power with which no deviation occurs for more than 24 hours.

What is claimed is:

1. A sheet prepared by coating or impregnating a substrate with a curable adhesive composition, said curable adhesive composition comprising:
   an unsaturated polyester oligomer (A) having an unsaturated double bond in a side chain, obtained by reacting 1 mole of a compound (a) having a hydroxyl group and/or an amino group, 2 to 20 moles of a cyclic acid anhydride (b) which is a dibasic acid anhydride, and 2 to 20 moles of an epoxide (c) having an ethylenically unsaturated group, the cyclic anhydride (b). and the epoxide (c) being present in about equimolar amounts,
   an adhesive polymer (B) and
   0.1 to 15 parts by weight of a polymerization initiator per 100 parts by weight of the total amount of the unsaturated polyester oligomer (A) and the adhesive polymer.

2. The sheet according to claim 1, wherein the amino group is a primary, secondary or tertiary amino group.

3. The sheet according to claim 1, wherein the cyclic acid anhydride is a polybasic acid anhydride.

4. The sheet according to claim 1, wherein the adhesive polymer is an adhesive acrylic polymer.

5. The sheet according to claim 4, wherein the adhesive acrylic polymer contains 0 to 100 parts by weight, per 100 parts by weight of said adhesive acrylic polymer, of a tackifier.

6. The sheet according to claim 4, wherein the adhesive acrylic polymer has at least one functional group selected from the group consisting of a hydroxyl group, a tertiary amino group, a carboxyl group, an amido group, an N-substituted amido group and a nitrile group.

7. The sheet according to claim 4, wherein the adhesive acrylic polymer further contains a polyisocyanate.

8. The sheet according to claim 1, wherein the adhesive polymer is an adhesive rubber-containing polymer.

9. The sheet according to claim 8, wherein the adhesive rubber-containing polymer contains 1 to 100 parts by weight, per 100 parts by weight of said adhesive rubber-containing polymer, of a tackifier.

10. The sheet according to claim 1, which contains 10 to 300 parts by weight, per 100 parts by weight of the adhesive polymer, of unsaturated polyester oligomer.

11. The sheet according to claim 1, which further contains a polymerization promoter.

12. The sheet according to claim 11, wherein the polymerization initiator and/or the polymerization promoter are/is micro-encapsulated.

13. The sheet according to claim 1, wherein the unsaturated polyester oligomer is a mixture of a polyester oligomer obtained by reacting a compound having a hydroxyl group and/or an amino group, a cyclic acid anhydride and an epoxide having an ethylenically unsaturated group and a polyester oligomer obtained by reacting a compound having a hydroxyl group and/or an amino group, a cyclic acid anhydride and an epoxide having no ethylenically unsaturated group.

14. A combination of a curable adhesive sheet comprising the curable adhesive composition recited in claim 1 and a polymerization initator with a curable adhesive sheet comprising an adhesive composition comprising an unsaturated polyester oligomer (A), an adhesive polymer (B) and a polymerization promoter, the compositions being cured by attaching the curable adhesive sheets to each other.

15. The combination of curable adhesive sheets according to claim 14, wherein each of the sheets is prepared by coating a substrate or impregnating a substrate with the composition.

16. The combination of curable adhesive sheets according to claim 15, wherein the polymerization initiator is a heat-cure type or an anaerobical cure type.

17. A sheet according to claim 1, wherein the unsaturated polyester oligomer (A) is at least one selected from oligomers of the following formulae (I) to (IV),

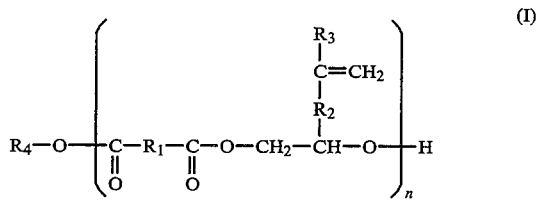

(I)

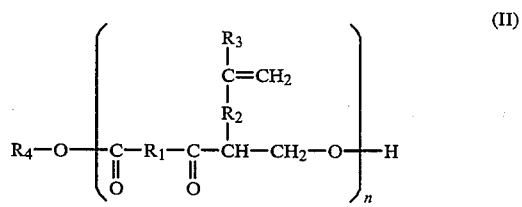

(II)

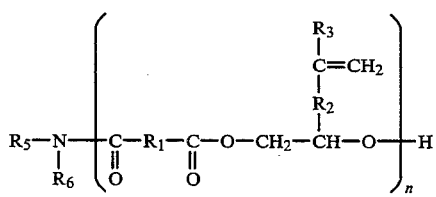

(III)

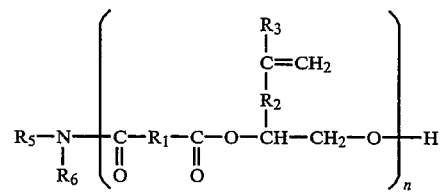

(IV)

wherein:
$R_1$ is a divalent organic moiety having 1 to 40 carbon atoms,
$R_2$ is a divalent organic moiety having 1 to 10 carbon atoms,
$R_3$ is hydrogen or methyl,
$R_4$ is a monovalent organic moiety having 1 to 40 carbon atoms,
$R_5$ is a monovalent organic moiety having 1 to 40 carbon atoms,
$R_6$ is hydrogen or a monovalent organic moiety having 1 to 10 carbon atoms, and
n is an integer of 2 or greater.

* * * * *

UNITED STATES PATENT AND TRADEMARK OFFICE
CERTIFICATE OF CORRECTION

PATENT NO. : 5,409,764
DATED : April 25, 1995
INVENTOR(S) : Tsukasa Otsuki et al.

It is certified that error appears in the above-indentified patent and that said Letters Patent is hereby corrected as shown below:

On title page, item [73] should read as follows:

—Toyo Ink Manufacturing Co., Ltd.—.

In the abstract, formula (II) should read

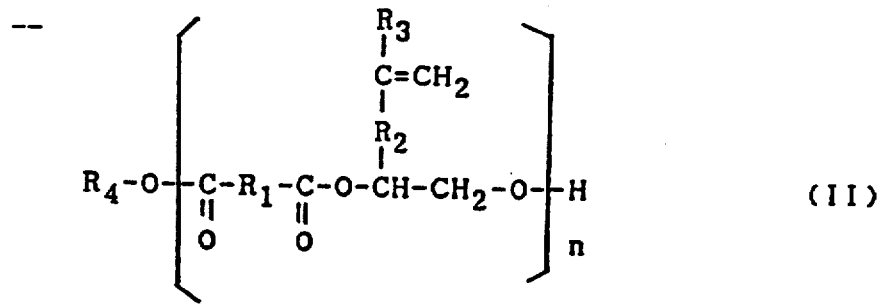

Column 3, lines 38-45, formula (II) should read

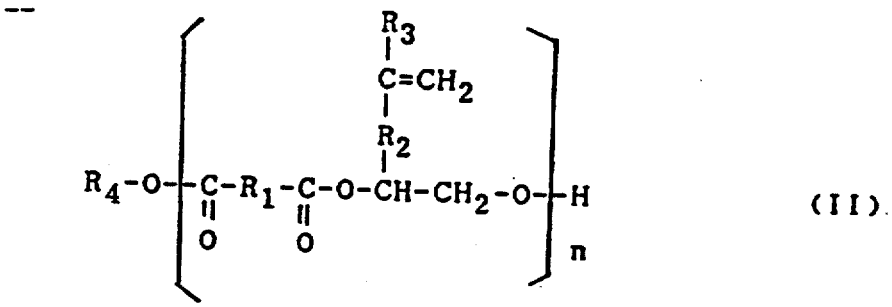

UNITED STATES PATENT AND TRADEMARK OFFICE
CERTIFICATE OF CORRECTION

PATENT NO. : 5,409,764
DATED : April 25, 1995
INVENTOR(S) : Tsukasa Otsuki et al.

It is certified that error appears in the above-indentified patent and that said Letters Patent is hereby corrected as shown below:

Claim 17, formula (II) should read

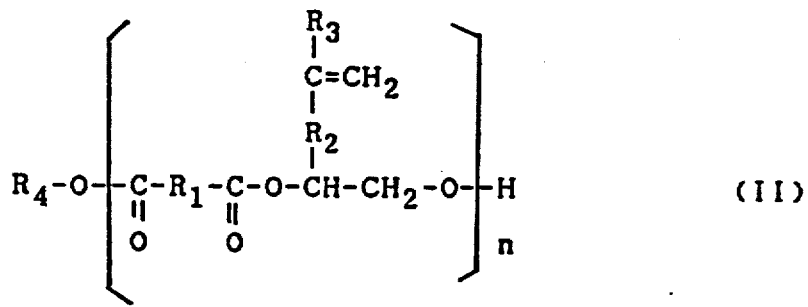

Signed and Sealed this

Nineteenth Day of September, 1995

BRUCE LEHMAN

*Attest:*

*Attesting Officer*  Commissioner of Patents and Trademarks